US010310056B2

(12) United States Patent
Hughes et al.

(10) Patent No.: US 10,310,056 B2
(45) Date of Patent: Jun. 4, 2019

(54) APPARATUS AND METHOD FOR ADJUSTING GUIDED WAVE RADAR PULSE WIDTH TO OPTIMIZE MEASUREMENTS

(71) Applicant: Honeywell International Inc., Morris Plains, NJ (US)

(72) Inventors: Michael Kon Yew Hughes, Vancouver (CA); Ion Georgescu, Bucharest (RO); Cornel Cobianu, Bucharest (RO)

(73) Assignee: Honeywell International Inc., Morris Plains, NJ (US)

( * ) Notice: Subject to any disclaimer, the term of this patent is extended or adjusted under 35 U.S.C. 154(b) by 524 days.

(21) Appl. No.: 15/008,110

(22) Filed: Jan. 27, 2016

(65) Prior Publication Data
US 2016/0266240 A1 Sep. 15, 2016

(51) Int. Cl.
G01S 7/40 (2006.01)
G01F 25/00 (2006.01)
(Continued)

(52) U.S. Cl.
CPC .......... G01S 7/4008 (2013.01); G01F 23/284 (2013.01); G01F 25/0061 (2013.01);
(Continued)

(58) Field of Classification Search
CPC .. G01F 23/284; G01F 25/0061; G01S 7/4008; G01S 13/103; G01S 13/88; G01S 2007/4013
(Continued)

(56) References Cited

U.S. PATENT DOCUMENTS 5,872,494 A 2/1999 Palan et al.
7,461,550 B2 12/2008 Calabrese
(Continued)

FOREIGN PATENT DOCUMENTS

EP 2026046 2/2009
EP 2120062 11/2009
(Continued)

OTHER PUBLICATIONS

International Searching Authority, "Notification of Transmittal of the International Search Report and the Written Opinion of The International Searching Authority, or the Declaration," International Application No. PCT/US2016/050457, dated Nov. 15, 2016, 5 pages, publisher International Application Division Korean Intellectual Property Office, Daejeon, Republic of Korea.
(Continued)

Primary Examiner — Timothy X Pham

(57) ABSTRACT

An apparatus includes at least one processing device configured to determine an optimal pulse width for obtaining level measurements associated with material in a tank. The at least one processing device is also configured to generate a control signal that causes a transmitter of a guided wave radar (GWR) to transmit a signal having the optimal pulse width. The at least one processing device is further configured to send the control signal to the transmitter. The at least one processing device can also be configured to alter a length of the optimal pulse width in order to reduce false echoes detected by the GWR, reduce a size of an upper dead zone of the GWR, and/or detect a change of impedance to identify a fault of a process connector in the GWR.

18 Claims, 8 Drawing Sheets

(51) Int. Cl.
*G01F 23/284* (2006.01)
*G01S 13/10* (2006.01)
*G01S 13/88* (2006.01)

(52) U.S. Cl.
CPC ............ *G01S 13/103* (2013.01); *G01S 13/88* (2013.01); *G01S 2007/4013* (2013.01)

(58) Field of Classification Search
USPC ........................................................ 342/124
See application file for complete search history.

(56) References Cited

U.S. PATENT DOCUMENTS

| | | | | |
|---|---|---|---|---|
| 7,636,059 | B1* | 12/2009 | Edvardsson | G01F 23/284 342/124 |
| 7,800,528 | B2 | 9/2010 | Nilsson et al. | |
| 2001/0050629 | A1* | 12/2001 | Benway | G01F 23/284 342/124 |
| 2003/0206131 | A1 | 11/2003 | Steinbuch | |
| 2004/0093942 | A1 | 5/2004 | Brun | |
| 2005/0017896 | A1 | 1/2005 | Klofer et al. | |
| 2006/0169039 | A1 | 8/2006 | Zalenski et al. | |
| 2006/0225499 | A1 | 10/2006 | Gravel et al. | |
| 2009/0033543 | A1* | 2/2009 | Nilsson | G01F 23/284 342/124 |
| 2009/0085794 | A1* | 4/2009 | Edvardsson | G01F 23/284 342/124 |
| 2009/0158839 | A1* | 6/2009 | Spanke | G01F 23/284 73/290 V |
| 2009/0302867 | A1* | 12/2009 | Schroth | G01F 23/284 324/642 |
| 2010/0231438 | A1 | 9/2010 | Ohlsson et al. | |
| 2014/0103950 | A1 | 4/2014 | Janitch | |
| 2014/0207395 | A1 | 7/2014 | Prinstil | |
| 2015/0011953 | A1 | 1/2015 | Schmidt | |
| 2015/0249342 | A1* | 9/2015 | Kapcia | H04B 5/0037 307/104 |
| 2015/0276458 | A1* | 10/2015 | Cobianu | G01F 23/284 342/124 |

FOREIGN PATENT DOCUMENTS

| | | |
|---|---|---|
| JP | H07-92252 | 4/1995 |
| WO | 2005038414 A1 | 4/2005 |

OTHER PUBLICATIONS

International Searching Authority, "Written Opinion of The International Searching Authority," International Application No. PCT/US2016/050457, dated Nov. 15, 2016, 5 pages, publisher International Application Division Korean Intellectual Property Office, Daejeon, Republic of Korea.

European Search Report issued for EP 15158997.5 dated Sep. 15, 2015, 6 pgs.

International Searching Authority, "International Search Report," International Application No. PCT/US2015/062593, dated Feb. 2, 2016, 3 pages, publisher The ISA/KR, International Application Division Korean Intellectual Property Office, Daejeon, Republic of Korea.

International Searching Authority, "Written Opinion of the International Searching Authority," International Application No. PCT/US2015/062593, dated Feb. 2, 2016, 6 pages, publisher The ISA/KR, International Application Division Korean Intellectual Property Office, Daejeon, Republic of Korea.

* cited by examiner

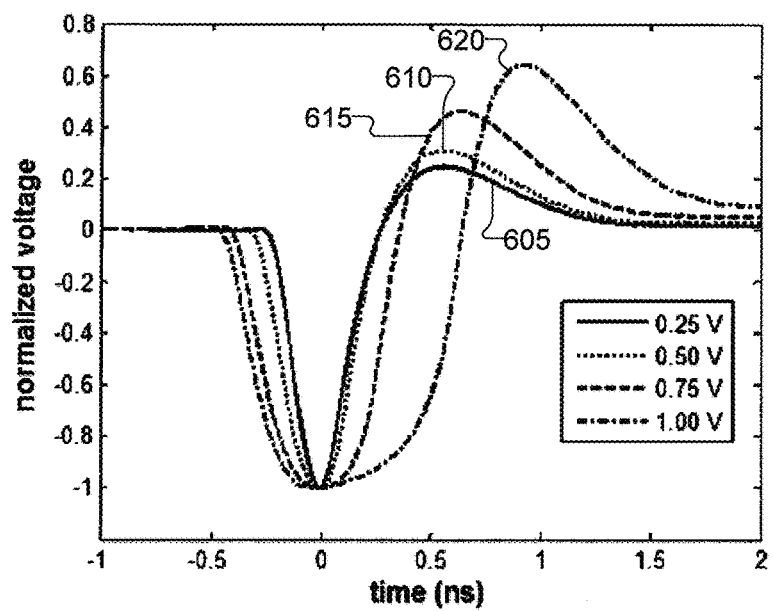
FIGURE 6
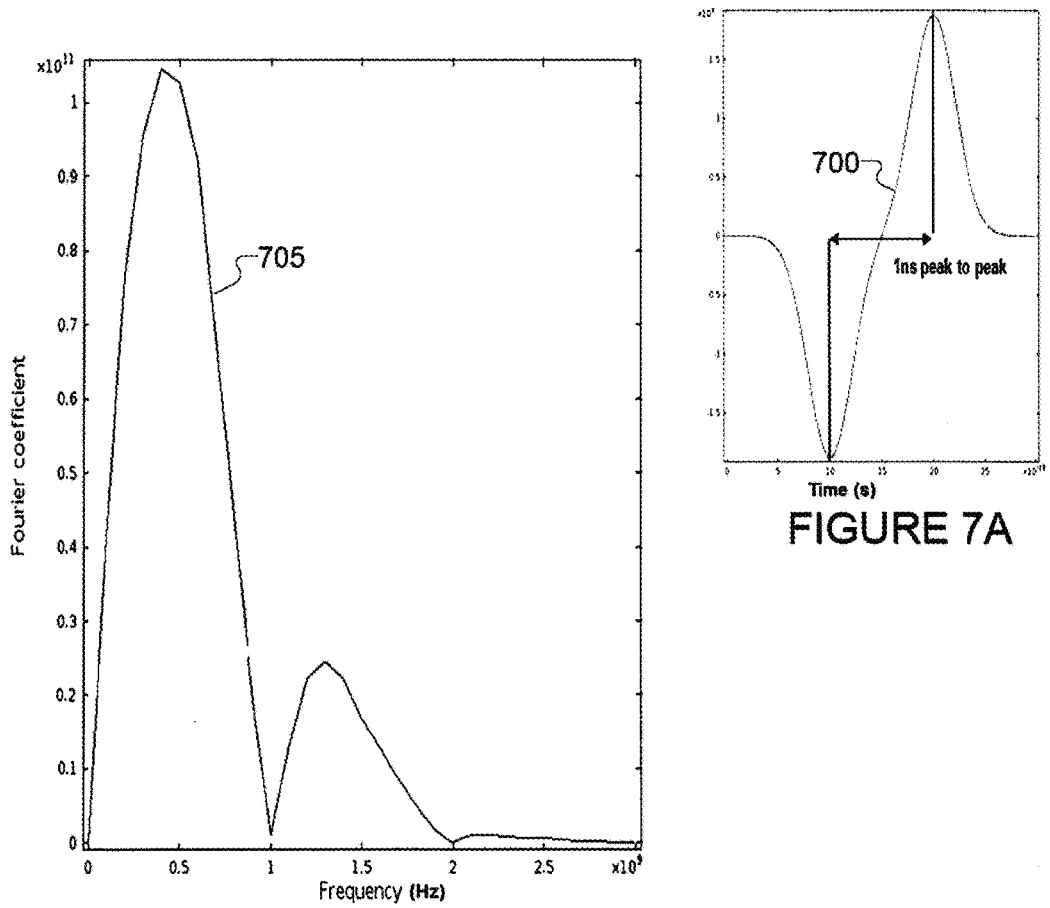
FIGURE 7A
FIGURE 7B

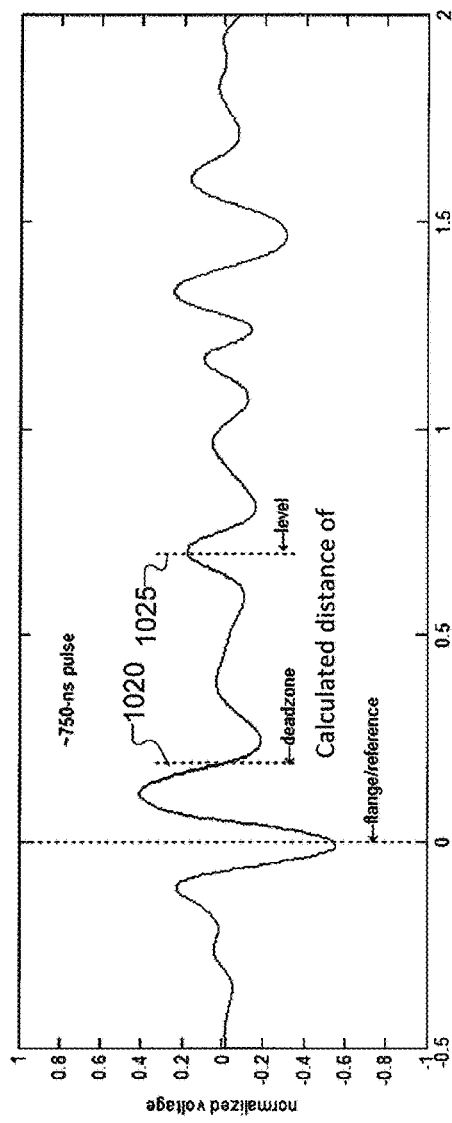
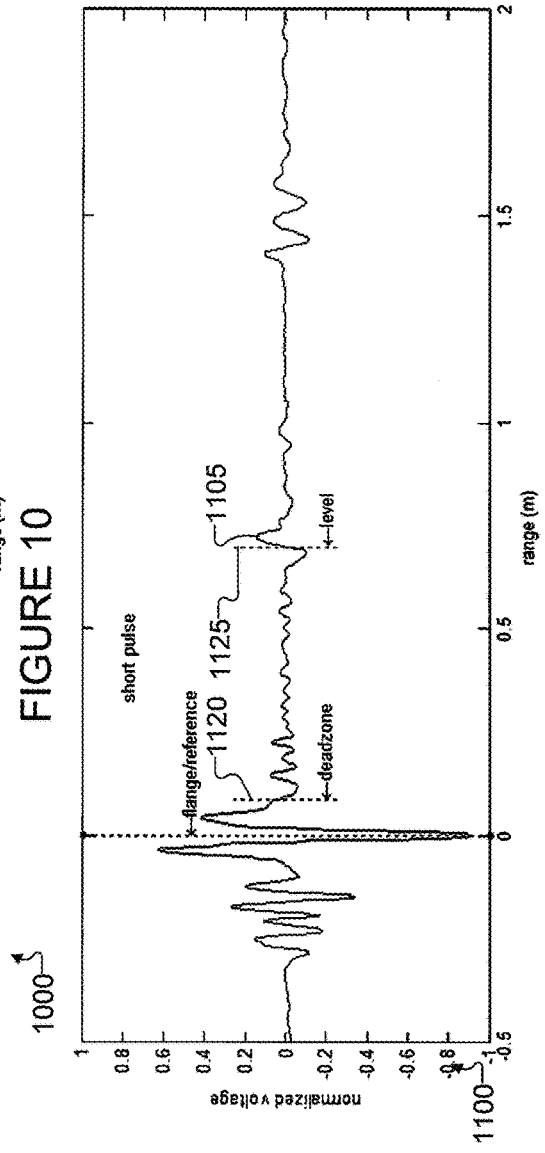
FIGURE 10
FIGURE 11

APPARATUS AND METHOD FOR ADJUSTING GUIDED WAVE RADAR PULSE WIDTH TO OPTIMIZE MEASUREMENTS

CROSS-REFERENCE TO RELATED APPLICATION AND PRIORITY CLAIM

This application claims priority under 35 U.S.C. § 119(a) to European Patent Application No. EP15158997 filed on Mar. 13, 2015. This European patent application is hereby incorporated by reference in its entirety.

TECHNICAL FIELD

This disclosure is generally directed to radar systems. More specifically, this disclosure is directed to an apparatus and method for adjusting guided wave radar pulse width to optimize measurements.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials. Processing facilities also include tanks for implementing an industrial process, such as receiving material through an input of the tank while allowing material to leave through an output of the tank.

Often times, it is necessary or desirable to measure the amount of material stored in a tank, for example, in order to control the level of material in the tank to be at desired level during an industrial process of receiving or releasing material in the tank. Radar gauges are used to measure an amount of material stored in a tank. Radar gauges typically transmit signals towards a material in a tank and receive signals reflected off the material in the tank.

Unfortunately, radar measurements can be affected by multiple reflections inside a tank, such as reflections from the tank's walls, bottom, roof, and obstructions like agitators, ladders, and heat coils. In some situations, false echoes associated with signals reflected off objects other than the material in a tank can interfere with the actual reflection of signals off the material in the tank, causing inaccuracies in level measurements.

Moreover, the full capacity of a tank is often used for storage and transfer, and level measurements typically need to be constantly reliable even as the level of material approaches the bottom or roof of the tank. This can be difficult to achieve with conventional radar gauges.

SUMMARY

This disclosure provides an apparatus and method for adjusting guided wave radar pulse width to optimize measurements.

In a first embodiment, a non-transitory computer readable medium embodies a computer program. The computer program includes computer readable program code that when executed causes at least one processing device to determine an optimal pulse width for obtaining level measurements associated with material in a tank. The computer program also includes computer readable program code that when executed causes the at least one processing device to generate a control signal that causes a transmitter of a guided wave radar (GWR) to transmit a signal having the optimal pulse width. The computer program further includes computer readable program code that when executed causes the at least one processing device to send the control signal to the transmitter.

In a second embodiment, an apparatus includes at least one processing device configured to determine an optimal pulse width for obtaining level measurements associated with material in a tank. The at least one processing device is also configured to generate a control signal that causes a transmitter of a GWR to transmit a signal having the optimal pulse width. The at least one processing device is further configured to send the control signal to the transmitter.

In a third embodiment, a method includes determining an optimal pulse width for obtaining level measurements associated with material in a tank. The method also includes generating a control signal that causes a transmitter of a GWR to transmit a signal having the optimal pulse width. The method further includes sending the control signal to the transmitter.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 6 illustrates example waveforms representing signals used to measure material in a tank according to this disclosure;

FIGS. 7A and 7B illustrate an example time-domain waveform of a bipolar pulse and an example transform of the bipolar pulse used in a guided wave radar according to this disclosure;

FIGS. 10 and 11 illustrate examples of reducing a height of a dead zone of measurements with a guided wave radar according to this disclosure;

DETAILED DESCRIPTION

FIGS. 1 through 13, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
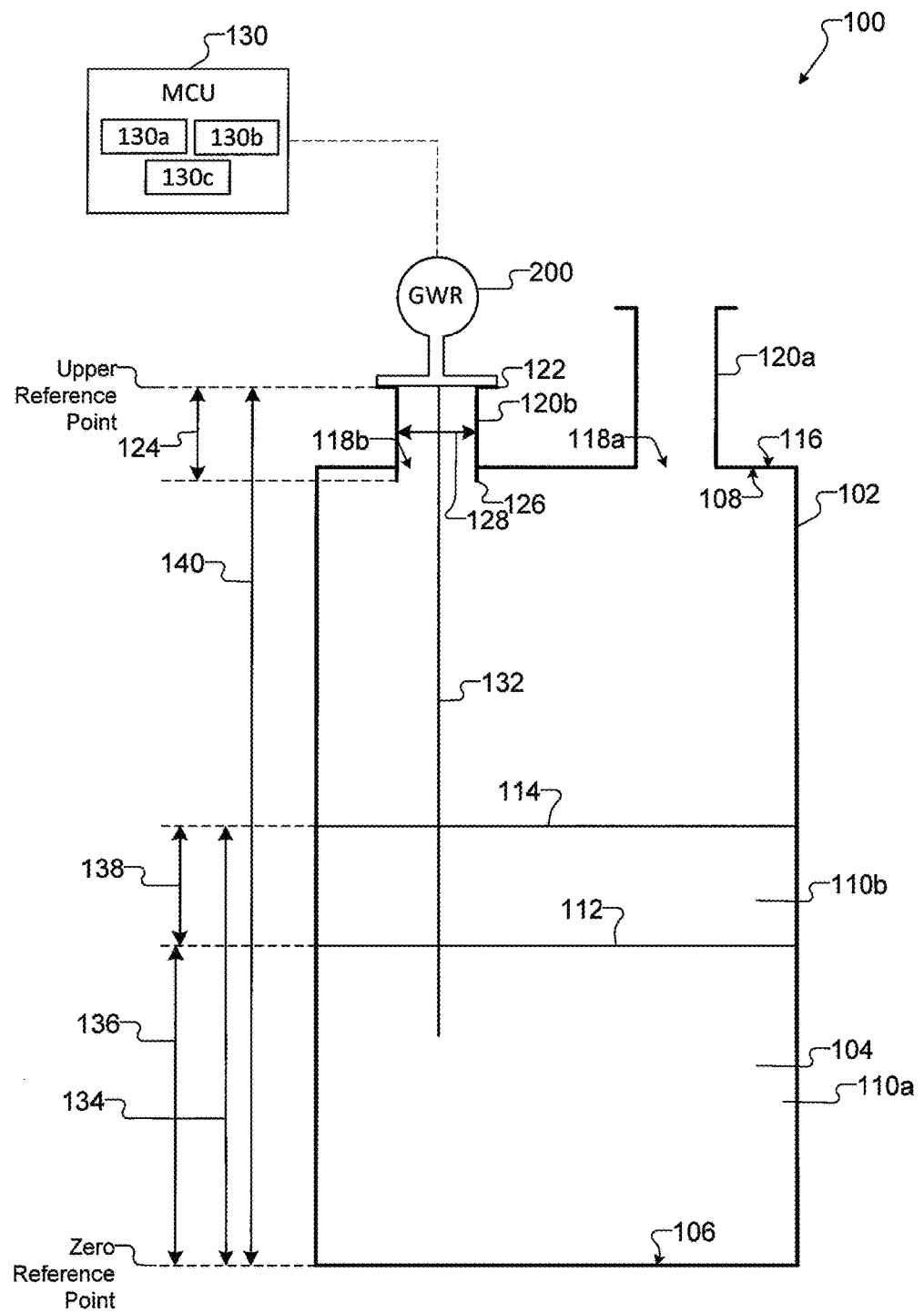
FIG. 1 illustrates an example system for adjusting a guided wave radar pulse width to optimize measurements of material in a tank according to this disclosure.

FIG. 1 illustrates an example system 100 for adjusting a guided wave radar (GWR) pulse width to optimize measurements of material in a tank according to this disclosure. As shown in FIG. 1, the system 100 includes a tank 102, which represents any suitable structure for receiving and storing at least one material 104. The tank 102 can have any suitable shape and size. The tank 102 can also form part of a larger structure, such as any fixed or movable structure containing or associated with one or more tanks 102 (like a movable tanker vessel, railcar, or truck or a fixed tank farm). The interior of the tank 102 includes a floor 106 at the bottom and a ceiling 108 at the top. In certain embodiments, the tank has an open top without a ceiling.

The tank 102 can be used to store any suitable material 104, such as one or more fuels, oils, or other processed or unprocessed hydrocarbons. Also, a single material 104 could be stored in the tank 102, or multiple materials 104 could be stored in the tank 102. Depending on the material(s) 104 stored in the tank 102, the material(s) 104 can sometimes "stratify" or form multiple layers. In the example shown in FIG. 1, there are two layers 110a-110b of material 104, and an interface 112 forms where the top surface of the first layer 110a meets the bottom surface of the second layer 110b. As a particular example, the tank 102 can be used to separate oil from water, in which case, the interface 112 represents where the bottom surface of the oil divides from water. Also, an air-material interface exists at the top surface 114 of the second layer 110b, and the air-material interface denotes the top of the material 104 in the tank 102.

A roof 116 of the tank 102 includes one or more openings or ports 118a-118b providing access to an interior of the tank 102, and nozzles 120a-120b can be coupled to the ports 118a-118b. In this example, the nozzle 120a is flush with the ceiling 108 of the tank 102, while the nozzle 120b is not flush with the ceiling 108 and extends some distance into the tank 102. A guided wave radar (GWR) 200 is a radar based level transmitter. The GWR 200 can be mounted to a top end 122 of the nozzle 120b in order to hold the GWR 200 away from the material 104 even when the tank 102 is full. A length 124 denotes the distance between the top end 122 of the nozzle 120b and a bottom end 126 of the nozzle 120b. The nozzle 120b also has an inner diameter 128. Note that the forms of the ports and nozzles shown here are examples only and that ports and nozzles could have any other suitable configurations.

The system 100 also includes a main control unit (MCU) 130, which controls the overall operation of the system 100. For example, the MCU 130 could receive level measurements from the GWR 200, control automatic loading or unloading of material 104 into or out of the tank 102, and generate an alarm when the level of material 104 is approaching the top or bottom of the tank 102 or when a possible leak is detected in the tank 102. The MCU 130 could be remotely located from the GWR 200, such as 50-100 meters away. In certain embodiments, system 100 does not include the MCU 130, in which case, the GWR 200 can provide an analog output that directly controls one or more actuators, such as a valve.

In some embodiments, a waveguide 132 can be used to direct or guide the signals from the GWR 200 to the material 104. The waveguide 132 includes any suitable structure for directing signals.

In particular embodiments, the GWR 200 implements Time Domain Reflectometry (TDR) to obtain measurements of the level of material 104 in the tank 102. For example, the GWR 200 can generate and transmit signals downward into the tank 102 and receive signals reflected off contents within the tank 102. The signals can reflect off the top surface 114 of the material 104, any interfaces 112 between different layers of material in the tank 102, the floor 106 of the tank 102, and any obstacles within the tank 102 (such as agitators, ladders, and heat coils). The GWR 200 or the MCU 130 can analyze received signals to estimate an overall height 134 of the material 104 in the tank 102 and possibly heights 136-138 of different layers of material 104 in the tank 102.

Level measurements could be made with reference to a "zero reference" point. For example, the zero reference point could denote the floor 106 of the tank 102 or the top end 122 of the nozzle 120b. Level measurements could also be made relative to a known distance, such as a total distance 140 between the top end 122 of the nozzle 120b and the floor 106 of the tank 102. In certain embodiments, the GWR 200 or MCU 130 receives a user input of the total distance 140 value, which is used to indicate the bottom of the tank, enabling a level measurement to be output relative to the floor 106.

The MCU 130 includes any suitable structure for controlling a level gauge for a tank, such as by controlling actuators that affect the flow of material into or out from the tank. For example, the MCU 130 could include at least one processing device 130a, at least one memory 130b, and at least one interface 130c. Each processing device 130a includes any suitable processing or computing device, such as a microprocessor, microcontroller, digital signal processor (DSP), field programmable gate array (FPGA), application specific integrated circuit (ASIC), or discrete logic devices. Each memory 130b includes any suitable storage and retrieval device, such as a random access memory (RAM), Flash or other read-only memory (ROM), magnetic storage device, solid-state storage device, optical storage device, or other storage and retrieval device. Each interface 130c includes any suitable structure facilitating communication over a connection or network, such as a wired interface (like an Ethernet interface) or a wireless interface (like a radio frequency transceiver) or an electrical signal network (such as a HART or FOUNDATION FIELDBUS network).

In certain embodiments, only the GWR 200 performs functions (such as TDR functions) to measure the level of material 104 in the tank 102. In other embodiments, depending on the implementation, the functions of the GWR 200, such as measuring the level of material in the tank, are split over GWR 200 and other electronic devices of the system 100. For example, the GWR 200 could include processing circuitry or other components that analyze received signals and identify level measurements, and the GWR 200 could pass those level measurements to the MCU 130 for use in controlling the level. In certain embodiments, the processing circuitry of the GWR 200 is implemented as a microprocessor on a printed circuit board assembly (PCBA) that executes firmware. As another example, the GWR 200 could transmit and receive signals and provide information about the signals to the MCU 130, which uses the information to identify the level measurements. Functionality for identifying the level measurements could also be divided between the MCU 130 and the GWR 200 in any suitable manner.

As described in more detail below, the pulse width of signals generated by the GWR 200 can be controlled in order to improve the accuracy of level measurements of the material 104 in the tank 102. The functionality for identifying the desired pulse width could be implemented within the GWR 200 or outside the GWR 200 (such as in the MCU 130).

Although FIG. 1 illustrates one example of a system 100 for adjusting a GWR pulse width to optimize measurements of material in a tank, various changes may be made to FIG. 1. For example, the functional division shown in FIG. 1 is for illustration only. Various components in FIG. 1 could be combined, further subdivided, rearranged, or omitted or additional components could be added according to particular needs.

Figures 2A, 2B:
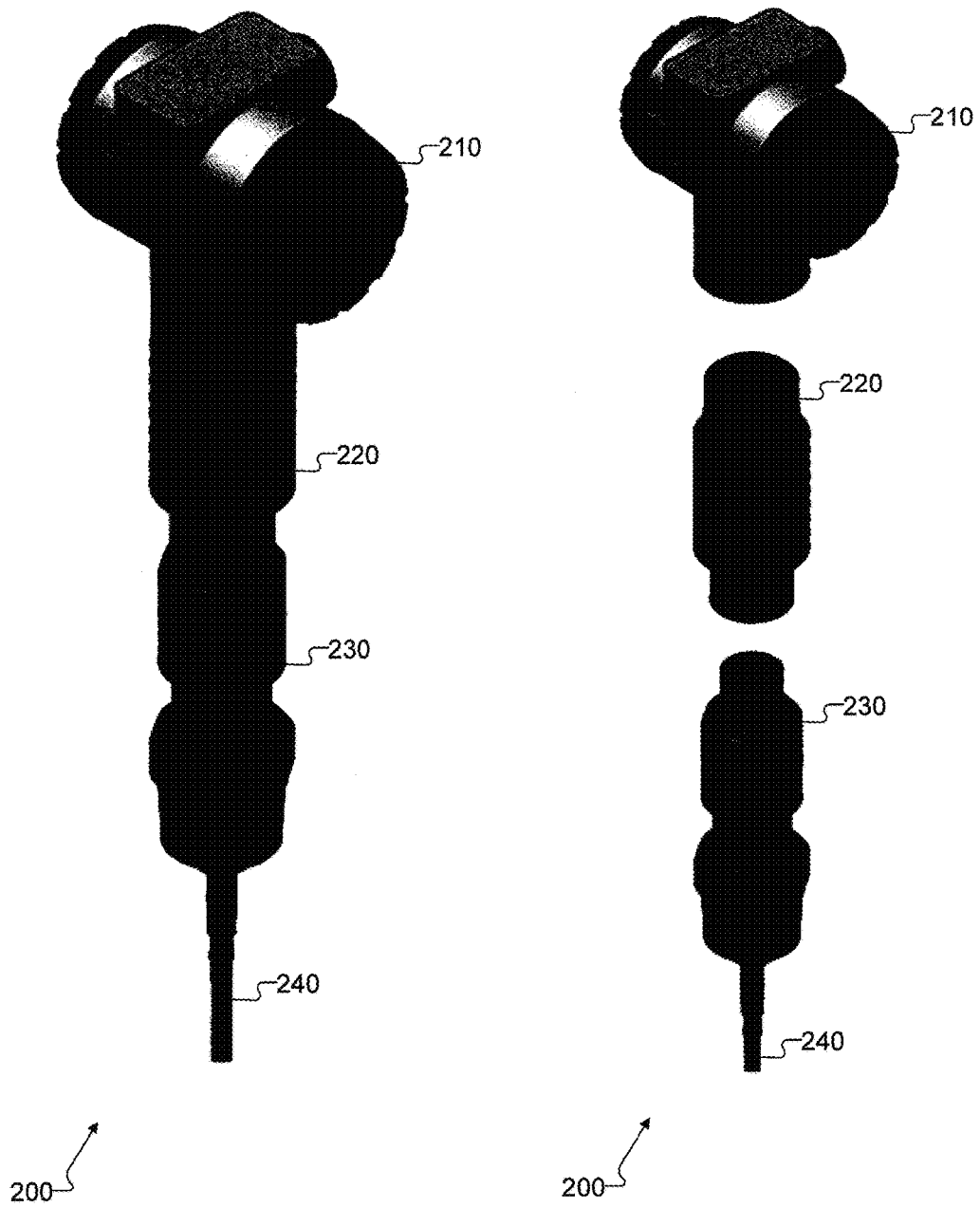
FIGS. 2A and 2B illustrate an example guided wave radar according to this disclosure.

FIGS. 2A and 2B illustrate an example GWR 200 according to this disclosure. For ease of explanation, the GWR 200 of FIGS. 2A and 2B is described as being used in the system 100 of FIG. 1. However, the GWR 200 could be used in any other suitable system.

As shown in FIGS. 2A and 2B, the GWR 200 includes a communications electronics housing 210, a sensor electronics housing 220, a process connector 230, and a probe 240. The communications electronics housing 210 houses or otherwise includes a terminal block, a display for presenting level measurements to a local user, a communication interface for communicating with the MCU 130, and a user interface for receiving user input parameters. The sensor electronics housing 220 includes a power accumulation module and sensor electronics. The process connector 230 includes a process seal for isolating the sensor electronics housing 220 from the environment within a tank 102 while allowing the probe 240 to be exposed to the environments within the tank 102. The probe 240 carries pulses transmitted from the sensor electronics housing 220 to the material 104 and carries pulses reflected inside the tank 102 back to the sensor electronics housing 220. In some embodiments, the probe 240 includes a waveguide, such as the waveguide 132. Examples of waveguides include a rod, a rope, a twin rod/rope, and a coaxial probe.

Although FIGS. 2A and 2B illustrate one example of a GWR 200, various changes may be made to FIGS. 2A and 2B. For example, the internal components within the GWR 200 could be arranged in any suitable manner within the various sections 210-240 of the GWR 200. Also, the form factor of the GWR 200 is for illustration only.

Figure 3:
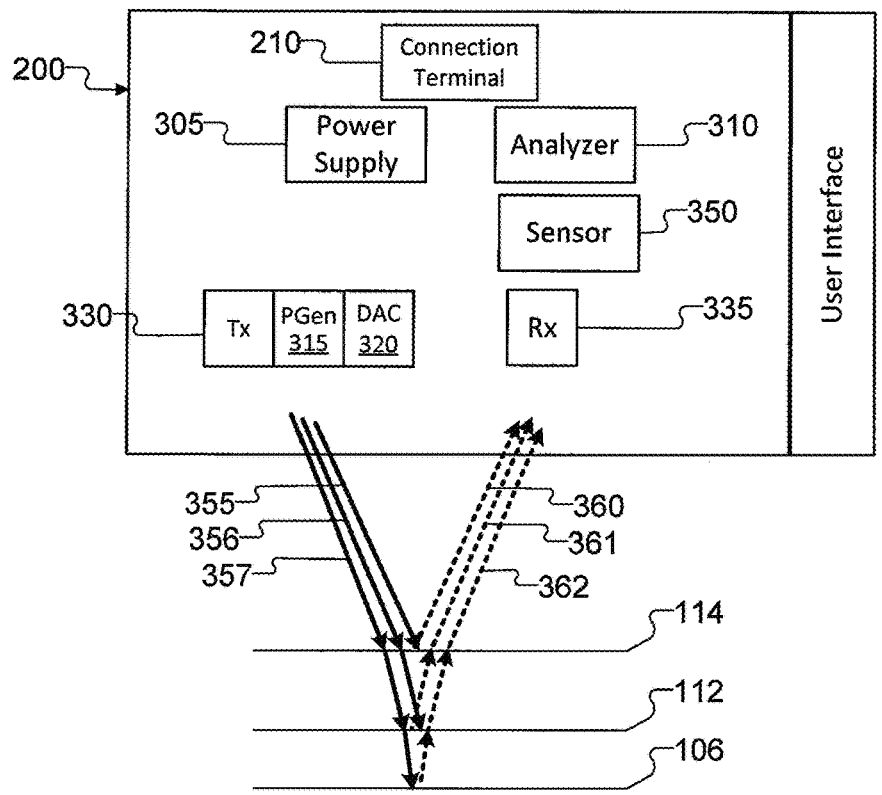
FIG. 3 illustrates examples of components of the guided wave radar in FIG. 2 according to this disclosure.

FIG. 3 illustrates examples of components of the GWR 200 in FIG. 2 according to this disclosure. As shown in FIG. 3, the GWR 200 includes the communications electronics housing 210, which includes a communication interface that connects the GWR 200 to and enables the GWR 200 to communicate with a display, the MCU 130, or another user interface or process interface. The communication interface supports any suitable communications, such as wireless data transfers or communications via a local area network, electrical signal network (such as a HART or FOUNDATION FIELDBUS network), Universal Serial Bus ("USB"), or other wired connection. The terminal block within the communications electronics housing 210 enables the GWR 200 to operate on a cycle. That is, the GWR 200 consumes large amounts of power for brief periods of a burst mode and accumulates charge (e.g., in capacitors) for the remaining time. Accordingly, the terminal block functions as the source of voltage and current for the components of the GWR 200.

The power accumulation module of the sensor electronics housing 220 includes a power supply 305 that supplies electrical power to the sensor electronics. The power supply 305 could represent any suitable source of operating power, such as a battery, a capacitor bank, fuel cell, or solar cell. The sensor electronics of the sensor electronics housing 220 include an analyzer 310. The analyzer 310 controls one or more functions of the GWR 200, including operations for adjusting or altering the GWR pulse width to optimize measurements described in more detail below. For example, the analyzer 310 could include a programmable controller, digital acquisition (DAQ) hardware for capturing information about reflected signals received within a tank 102, and processing hardware (such as a microprocessor, microcontroller, PCBA, DSP, FPGA, ASIC, or discrete logic) for processing information to identify level measurements.

As described in more detail below, the analyzer 310 can determine an optimal pulse width for signals that the GWR transmits into the tank 102. The analyzer 310 also identifies (for example, in a look up table) a control voltage that corresponds to the optimal pulse width and uses the control voltage to control other components of the GWR 200 to achieve the desired pulse width. For example, the analyzer 310 could determine the optimal pulse width using parameters stored in memory or parameters input by a user through the communications electronics housing 210. Example parameters can include the interior diameter 128 of the nozzle 120b, the tank height 140, the length 124 of the nozzle 120b, and the type of mounting used to couple the GWR 200 to the tank 102.

Signals reflected off material 104 or structures in a tank 102 are analyzed by the analyzer 310 to identify level measurements. For example, the analyzer 310 can identify and classify peaks in waveforms of received signals and estimate the length of paths traveled by signals reflected off the top surface 114 of the material 104, any interfaces 112 between different layers of material in the tank 102, the end of the probe, the floor 106 of the tank 102, and any obstacles within the tank 102. The analyzer 310 can also determine the time of flight for various reflected signals, where the time of flight represents the length of time from transmission of a signal to reception of the signal.

The analyzer 310 can include a DAC 320. Alternatively, the DAC 320 receives a digital signal from the analyzer 310, converts the received signal into analog format, and provides analog formatted signals to the pulse generator 315.

The GWR 200 includes a pulse generator 315 and a digital-to-analog converter (DAC) 320. The pulse generator 315 is configured, in response to receiving a control signal having a control voltage, to generate pulses of signals 355-357 transmitted into the tank 102. The pulse widths of the signals 355-357 output from the pulse generator 315 are determined by the voltage provided by the analyzer 310 to the pulse generator 315. The transmitted signals 355-357 can have the same or have different pulse widths that penetrate to different depths in the tank 102. The pulse generator 315 provides an analog signal to a transmitter 330 for transmission into the tank 102 through the waveguide. Note that the pulse generator 315 or the DAC 320 could be included within the transmitter 330.

Although shown as separate elements, the transmitter 330 and the receiver 335 could represent a single transceiver. The transmitter 330 includes any structure(s) for providing signals for transmission. The receiver 335 includes any structure(s) for obtaining and processing signals received.

The receiver 335 receives the signals 360-362 that have reflected off material interfaces or objects in the tank 102. As shown in FIG. 3, the signals 360-362 received by the receiver 335 include signals 360-362 reflecting off an air-material interface at the top surface 114, signals 361-362 reflecting off the interface 112, and signals 362 reflecting off the bottom 106 of the tank 102.

The GWR 200 includes one or more sensors 350, such as a transducer that converts reflected signals into electrical signals that can be processed by the analyzer 310. Various other types of sensors could also be used in the GWR 200. In some embodiments, an analog-to-digital converter (ADC) converts analog signals from the sensor 350 into digital signals for the analyzer 310.

In some embodiments, the sensors 350 include a temperature sensor that informs the analyzer 310 of the temperature associated with the circuitry of the analyzer 310 and the pulse generator 315. For example, the temperature sensor can measure the temperature of air surrounding the circuitry of the analyzer 310 and pulse generator 315. As another example, the temperature sensor can measure the temperature of the circuitry (for example, the semiconductor in the ASIC). The GWR 200 can be configured to operate within an industrial standard temperature range (such as −40° C. to +85° C.), and semiconductor materials with components of the GWR 200 (such as the pulse generator 315) can exhibit varied performance at different operating temperatures. As a particular example, the pulse generator 315 could generate pulses of different widths in response to the same control voltage when operating at different temperatures. The GWR 200 can counteract the temperature effect to achieve a desired output pulse width by adjusting the control voltage as a function of measured temperature. As such, the GWR 200 can adjust the voltage to transmit a pulse at a desired pulse width at any operating temperature within an industrial standard temperature range. Automatically maintaining pulse consistency over the industrial standard temperature range is a technical advantage of the GWR 200.

Although FIG. 3 illustrates examples of components of the GWR 200 in FIG. 2, various changes may be made to FIG. 3. For example, the internal components 305-350 within the GWR 200 could be arranged in any suitable manner within the various sections 210-240 of the GWR 200.

Figure 4:
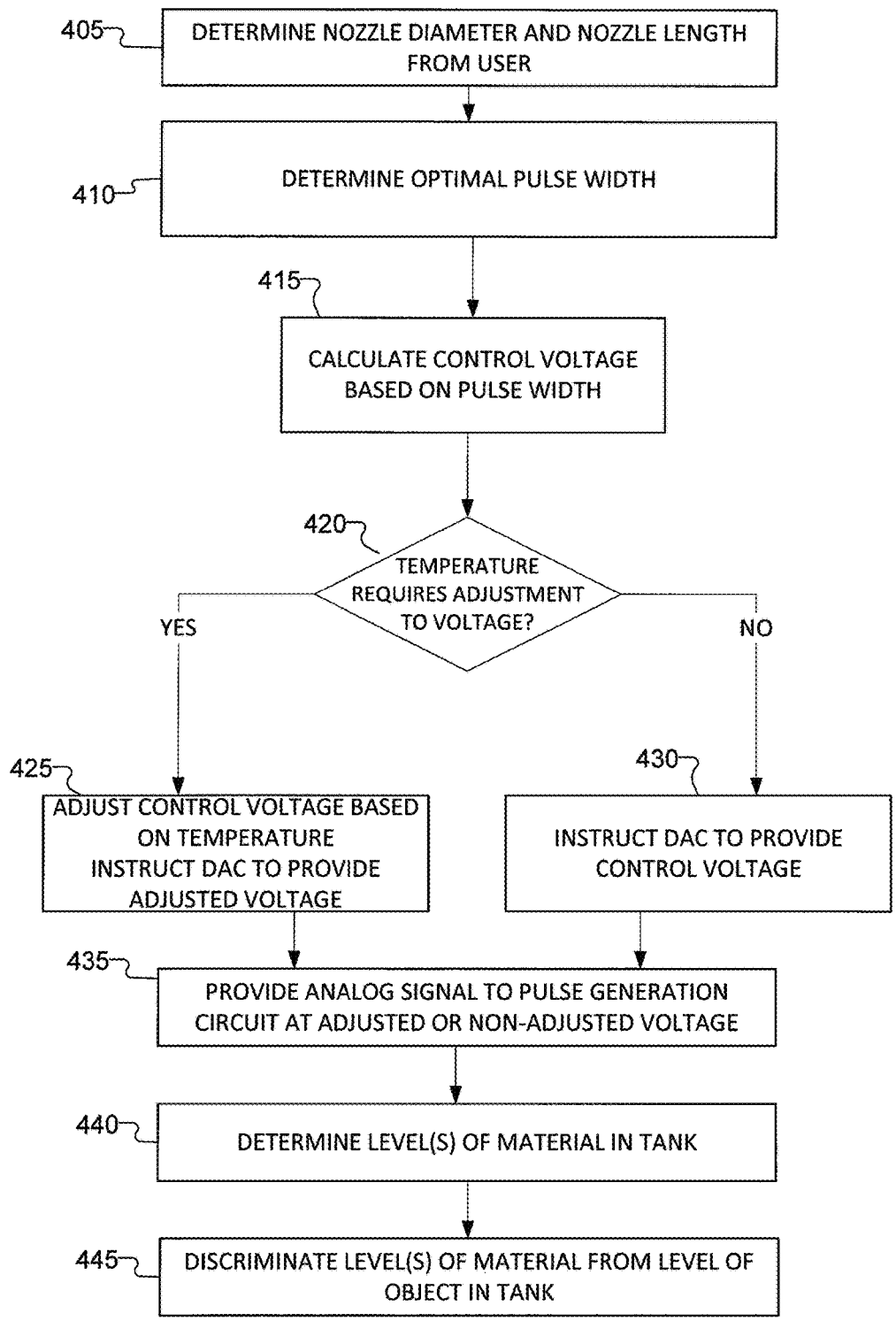
FIG. 4 illustrates an example process for adjusting a guided wave radar pulse width to optimize measurements according to this disclosure.

FIG. 4 illustrates an example process 400 for adjusting a guided wave radar pulse width to optimize measurements according to this disclosure. For ease of explanation, the process 400 of FIG. 4 is described as being used in the system 100 of FIG. 1 with the components shown in FIG. 3. However, the process 400 could be used in any other suitable device or system.

The process 400 can be used to reduce false echoes (also called false reflections) associated with the GWR 200. For example, in order to reduce or avoid the nozzle effect and reduce false echoes, the process 400 includes selecting an optimal pulse width that is above a threshold, such as a cutoff frequency ($f_{cutoff}$). The process 400 can also be used to provide other technical advantages, such as:

reducing the size of a dead zone;
detecting leakage of process fluid into the process connector 230; and
discriminating an object (such as an inlet pipe) submerged in the material 104 from the material 104 itself.

As shown in FIG. 4, parameters associated with a nozzle are determined at step 405. The parameters could, for example, include the nozzle diameter 128 and the nozzle length 124. In some embodiments, the system 100 receives these parameters from a user, such as via a user interface of the MCU 130 or the GWR 200. In other embodiments, the parameters can be obtained from memory, such as when the parameters were previously provided to the GWR 200 or when the GWR 200 is configured to measure levels in tanks 102 that share common parameters.

An optimal pulse width for the GWR is determined at step 410. For example, in order to reduce false echoes associated with the nozzle effect, the system 100 could select a pulse width that corresponds to a frequency greater than or equal to a calculated cutoff frequency ($f_{cutoff}$), such that most of the energy of the radar pulse occurs in a bandwidth of lower frequencies than the cutoff frequency. The system 100 can perform this calculation online (such as in response to the obtained parameters) or offline (such as by generating a table of $f_{cutoff}$ values corresponding to a set of nozzle dimensions). Equation (1) below expresses one example relationship between the $f_{cutoff}$ value in gigahertz (GHz) and nozzle dimensions and probe dimensions.

$$f_{cutoff} \cong \frac{190.85}{(D+d)\sqrt{\varepsilon_r}} \quad (1)$$

Here, D represents the diameter of the nozzle 120b, d represents the diameter of the probe 240 or waveguide 132, and $\varepsilon_r$ represents the relative dielectric constant of the material between the inner conductor and outer conductor of the probe 240 or waveguide 132. The approximation of the $f_{cutoff}$ value in Equation (1) can be modified to include a multiplier for adjusting the approximation.

A control voltage corresponding to the optimal pulse width is calculated or otherwise determined at step 415. For example, the system 100 can determine the control voltage using an equation or a look up table, wherein the input parameters are temperature and desired pulse width. For example, the system 100 can calculate the voltage needed to cause the pulse generator 315 to output signals having the desired pulse width. In some embodiments, the system uses a model (such as those shown in FIG. 5) to determine the control voltage corresponding to a pulse width. Note that pulse width is generally inversely proportional to bandwidth.

A determination is made at step 420 whether the control voltage should be adjusted to compensate for temperature. Even when the optimal pulse width has been determined, the actual pulse width output from the pulse generator 315 can vary due to temperature or batch variation. The GWR 200 can help to provide more consistent performance within a range of operating temperatures by applying an adjustment to the control voltage. When a voltage adjustment is appropriate, an adjusted control voltage is generated using a DAC (such as the DAC 320) at step 425. Otherwise, when a voltage adjustment is not appropriate, an unadjusted control voltage is generated using a DAC (such as the DAC 320) at step 430.

An analog signal is provided to a pulse generator at an adjusted or unadjusted level at step 435. In response to the received voltage level, the pulse generator generates and outputs a pulse at the corresponding pulse width. One or more levels of material in a tank are identified at step 440. Each level could be determined in any suitable manner, such as by using TDR and time-of-flight calculations. The analyzer 310 controls the transmitter 330 to output a series of signals that are used to obtain level measurements during this time. For example, a series of signals can include thousands or tens of thousands of pulses. In particular embodiments, the GWR 200 can transmit one pulse per microsecond.

The levels of objects in the tank are discriminated from the level(s) of material 104 in the tank at step 445. Example objects in the tank 102 can include an inlet pipe, a horizontal flange, or other solid structure. Object discrimination enables the GWR 200 to avoid interpreting a reflection off an object to be a reflection off the material 104 or an interface thereof.

During this process, the analyzer 310 determines the pulse width for each signal in a series of signals transmitted from the GWR 200 in order to perform object discrimination. For example, the analyzer 310 can instruct the transmitter 330 to output signals 355-357 at multiple pulse widths. The analyzer 310 can use an Equivalent-Time Sampling (ETS) technique or other technique in which each pulse corresponds to a certain range of measurements.

The GWR 200 implements techniques to accomplish ETS. As a specific example, the GWR 200 can accomplish ETS by having a pair of pulses, each is generated by a separate oscillator circuit. The first pulse triggers the pulse generation. The second pulse determines the sample-timing of the pulse reflection. For example, if the second pulse follows by say a nanosecond (i.e., $10^{-9}$ seconds) after the first pulse then the sampling distance is c/2*1e-9 seconds=15 cm away. Each successive receive pulse has a slightly longer time delay representing an additional distance of, for example, 6 mm, such that the probe is sampled at distances of 15 cm, 15.006 cm, 15.012 cm and so forth with each successive pulse. Other techniques can be used to accomplish ETS without departing from the scope of this disclosure.

Although FIG. 4 illustrates one example of a process 400 for adjusting a GWR pulse width to optimize measurements, various changes may be made to FIG. 4. For example, while shown as a series of steps, various steps in FIG. 4 could overlap, occur in parallel, occur in a different order, or occur any number of times.

Figure 5:
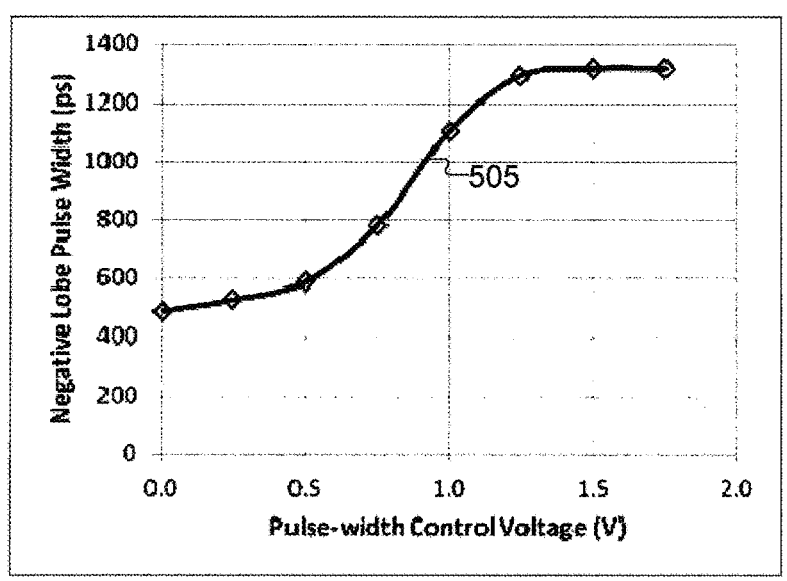
FIG. 5 illustrates an example relationship between pulse width and control voltage in a guided wave radar according to this disclosure.

FIG. 5 illustrates an example relationship between pulse width and control voltage (V) in a GWR according to this disclosure. In particular, FIG. 5 shows a graphical representation of the negative lobe of the pulse versus control voltage (V), which is denoted by line 505. The line 505 can be used to define a model that is used to identify a control voltage associated with a desired pulse width.

FIG. 6 illustrates example waveforms representing signals used to measure material in a tank according to this disclosure. As shown in FIG. 6, the transmitter 330 transmits signals 605-620 into the tank 102 at different pulse widths associated with control voltages of 0.25 V, 0.5 V, 0.75 V, and 1.0 V, respectively. As shown here, the waveforms of the transmitted signals vary depending on the pulse widths.

FIGS. 7A and 7B illustrate an example time-domain waveform 700 of a bipolar pulse and an example transform 705 of the bipolar pulse used in a guided wave radar according to this disclosure. In FIG. 7A, the horizontal axis represents time in nanoseconds, and the vertical axis represents electric field. In the waveform 700, each half pulse has a width equal to 0.5 ns, and the peak-to-peak time interval is 1 ns.

In FIG. 7B, the bipolar pulse-frequency spectrum of the transform 705 is in the frequency domain. The horizontal axis represents frequency in gigahertz, and the vertical axis represents Fourier coefficients intensity. The spectrum 705 shows that the bipolar pulse has no direct current (DC) component, while a 3 decibel (dB) frequency bandwidth is smaller than that of a unipolar Gaussian pulse having a width of 0.5 ns (FWHM) and an FFT spectrum of 3 dB bandwidth of about 0.85 GHz. In the case of a unipolar (monopolar) Gaussian pulse, the product of the peak-to-peak time interval ($\Delta t$) and the bandwidth ($\Delta f$) is greater than or equal to 0.44 ($\Delta t \times \Delta f \geq 0.44$). In the case of other shaped pulses, relationship between peak-to-peak time interval and bandwidth is more complex.

The transformation between FIGS. 7A and 7B shows that an FFT of a waveform produces a spectrum. A reduction in the peak-to-peak time interval ($\Delta t$) produces an increase in bandwidth. As such, if the bandwidth of a transmitted signal increases into the frequency range of higher-order modes, the higher-order modes become excited and appear as "ringing" in the reflected signals. In this example, the energy of the pulse is disposed predominantly within the bandwidth 0-2 GHz, as exhibited by the higher amplitude of the spectrum below 2 GHz compared to the much lower level of energy of the spectrum above 2 GHz. As "ringing" would occur at frequencies above 2 GHz in this example, the cutoff frequency is positioned at approximately 2 GHz.

Figure 8:
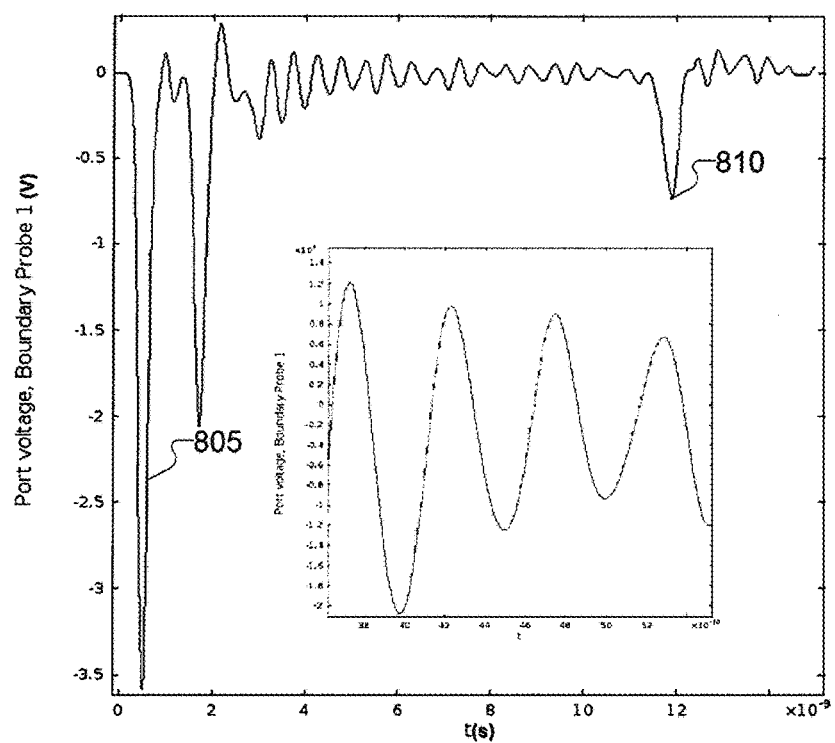
FIGS. 8 and 9 illustrate examples of handling a "ringing" nozzle effect in a guided wave radar according to this disclosure.
Figure 9:
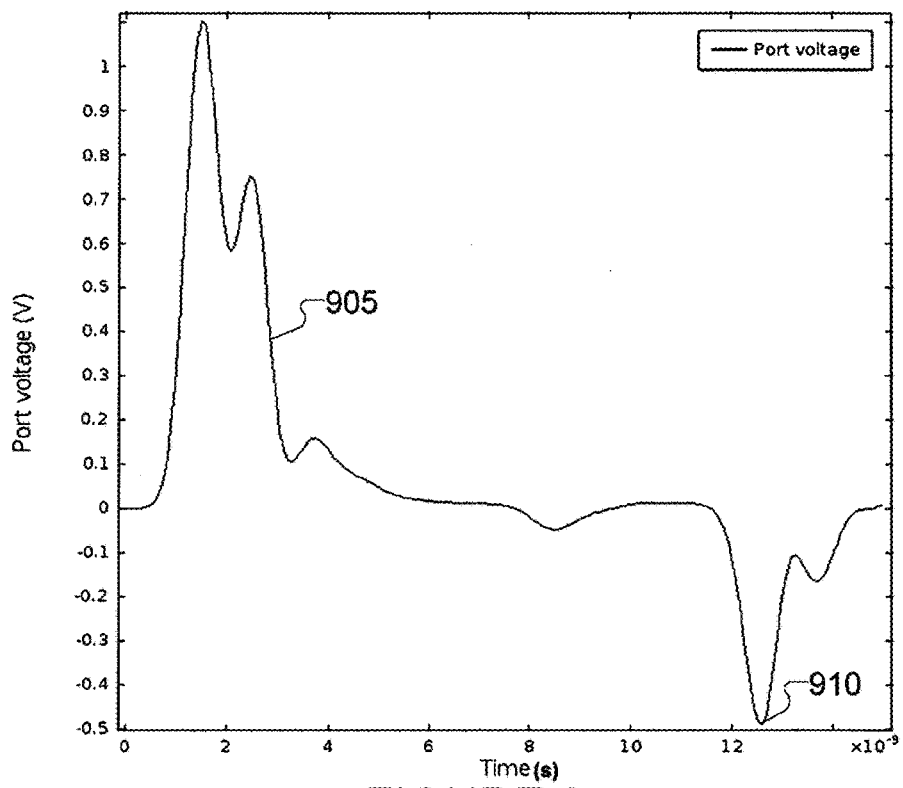

FIGS. 8 and 9 illustrate examples of handling a "ringing" nozzle effect in a GWR according to this disclosure. In this example, it is assumed that the receiver of the GWR 200 is disposed within a six-inch diameter nozzle, where the received signal is generated in response to a transmission of a unipolar signal through the same nozzle. In FIG. 8, the unipolar signal transmitted from the GWR 200 has a 250 ns pulse width, and the waveform is not inverted. In FIG. 9, the unipolar signal transmitted from the GWR 200 has a 750 ns pulse width.

The waveforms in FIGS. 8 and 9 were obtained by simulating level-like reflections in a metal tank and measuring the response of the GWR 200 system. In FIG. 8, an end-of-probe in air reflection was used as a model reflection. This model reflection is similar to a level reflection except that the signal is not inverted as would be the case for a level reflection. That is, the probe of the GWR 200 was disposed in the air of the empty tank such that the end of the probe is disposed 1.2 m meters from the upper reference point 122 and the floor 106 is disposed substantially greater than 1.2 m away and does not influence the reflection. In FIG. 9, to simulate the level in a metal tank, a perfect electric conductor (PEC) was modeled 1.2 m meters from the upper reference point 122. A PEC creates a reflection very similar to a true liquid level aside from a difference in amplitude. The peak 810 is of the same sign as the interrogation signal, but the peak 910 (due to the surface reflection) is in opposition to the phase of the interrogation signal. In other words, the interrogation peak and the peak 810 are in the down direction; yet in FIG. 9, the peak 910 is in the down direction and the interrogation pulse is in the up direction. Regardless of the sign of the reflection, the observed behavior of nozzle effects is similar to a real system with the combination of nozzle size and pulse width. As the ringing effect is determined by the geometry of the nozzle in conjunction with the pulse width, a similar "ringing" result can be obtained when the received signal comes from the top surface 114 of the material to be measured, but the phase of the peak from the surface of a material depends on the type of material.

As shown in FIG. 8, a waveform 805 exhibits a "ringing" nozzle effect, meaning peaks unrelated to the material 104 or structures in the tank 102 are detected by the GWR 200 during the length of time from transmission of the 250 ns pulse width unipolar signal to reception of its reflection off the end of the probe. That is, transmission of the 250 ns pulse width unipolar signal into the tank through the nozzle produces the shown false echoes that interfere with the desired reflections, such as when the tank is no longer empty. A peak 810 represents a reflection off the end-of-probe (a peak with a phase change is obtained when the received signal comes from the top surface 114 of the material in the tank 102), but interference peaks can have the same or larger amplitudes and timing as the peak 810. The "ringing" nozzle effect within the waveform 805 is an indicator that the higher bandwidth corresponding to the 250 ns pulse is too high for the six-inch diameter nozzle and that the pulse width is too short, and thus the higher order modes are generated in that nozzle for this pulse duration. These parasitic higher order modes interfering with good modes are at the origin of the parasitic ringing effects from FIG. 8.

As shown in FIG. 9, a waveform 905 contains approximately four times fewer peaks within the same time interval compared to the waveform 805 in FIG. 8. Peaks which can be mistaken for a level measurement presents a problem (present in FIG. 8) that is not present in FIG. 9. The absence of detectable interference from the waveform 905 is an indicator that a lower bandwidth corresponding to a longer 750 ns pulse width is appropriate for avoiding the "ringing" nozzle effect in the six-inch diameter nozzle. A peak 910 clearly represents a reflection off a simulated interface, as simulated by a perfect electrical conductor (PEC) for the purpose of modeling simplicity, but the results are similar when the received signal comes from the top surface 114 of the actual material in the tank 102 (the phase of the peak 910 will be changed). When implementing the process 400 seeking to accurately measure the level of material in the tank 102 and avoid false echoes, the analyzer 310 can determine that a transmission from the GWR 200 into a six-inch nozzle should have a pulse width longer than 250 ns, such as a 750 ns pulse width.

FIGS. 10 and 11 illustrate examples of reducing a height of a dead zone of measurements with a guided wave radar according to this disclosure. In some embodiments, the GWR 200 cannot accurately detect the level of material in the tank 102 when the material 104 is within a minimum distance from the top of the probe (such as the probe 240). For example, short-pulse transmissions can interact with the process connector 230 and generate false echoes. Accordingly, this zone is referred to as the upper dead zone. The size of the dead zone varies depending on the pulse width of the signal transmitted from the GWR 200. The GWR 200 can therefore adjust the pulse width of transmissions in order to obtain measurements of the level of material close to the top end 122 of the nozzle 120b.

A graph 1000 in FIG. 10 shows a larger dead zone corresponding to a bipolar signal transmitted from the GWR at a 750 ns pulse width. A graph 1100 in FIG. 11 shows a smaller dead zone corresponding to a bipolar signal transmitted from the GWR at a 250 ns pulse width. The vertical axis in each figure represents the amplitude of the reflected signals received by the GWR receiver that is disposed within a nozzle, where the received signal is in response to a transmission of a bipolar signal through the same nozzle into the tank. The horizontal axis in each figure represents a calculated distance in meters (m) with reference to the upper reference point at the top end 122 of the nozzle 120b (meaning the upper reference point is located at zero meters in the graphs 1000 and 1100).

As shown in FIG. 10, example waveform 1005 represents a signal received by the GWR 200 with a rod probe disposed through a nozzle into a tank containing a level of oleic acid. The waveform 1005 represent reflected signals off the oleic acid level (approximately 0.7 m distant). A dead zone line 1020 represents the minimum range/maximum level measurement for bipolar transmissions at a 750 ns pulse width. Vertical dashed line 1025 indicates a peak position for the top surface 114 level, but also the interface level (such as interface 112) and end of probe level are shown in the waveform 1005. Note that in this example, an industrial oil is underneath the interface level.

In FIG. 11, example waveform 1105 represents a signal received by the GWR 200 with the rod probe disposed through a nozzle into a tank containing of the same oleic acid as in FIG. 10. A dead zone line 1120 represents the minimum measurement level for bipolar transmissions at a 250 ns pulse width. Vertical dashed line 1125 indicates a peak position for the top surface 114 level.

As can be seen here, the dead zone line 1120 in FIG. 11 is closer to the zero meter level than the dead zone line 1020 in FIG. 10. This indicates that the GWR 200 can obtain accurate level measurements near the top of the probe by adjusting to shorter pulse width transmissions.

The examples in FIGS. 8 through 11 shows that a pulse width that is too short causes false echos and higher order mode interferences, an increased pulse width causes an enlarged dead zone, and a pulse width that is too long causes inaccuracies. Accordingly, the GWR 200 is configured to set or alter the pulse width of signals transmitted into the tank. For example the GWR 200 can increase the length of the pulse width in order to reduce false echoes, reduce the length of the pulse width in order to reduce the size of the upper dead zone of the GWR. Accordingly, determining the optimal pulse width involves a tradeoff between resolution and degree of false reflections.

Although FIGS. 5 through 11 illustrate example charts of various characteristics, these charts are for illustration only. Other charts showing different characteristics could also be used depending on, for example, the design of the GWR 200 and the environment in which the GWR 200 is used.

Figure 12A:
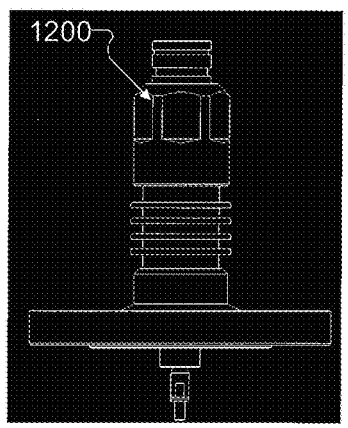
FIGS. 12A and 12B illustrate an example process connector according to this disclosure.
Figure 12B:
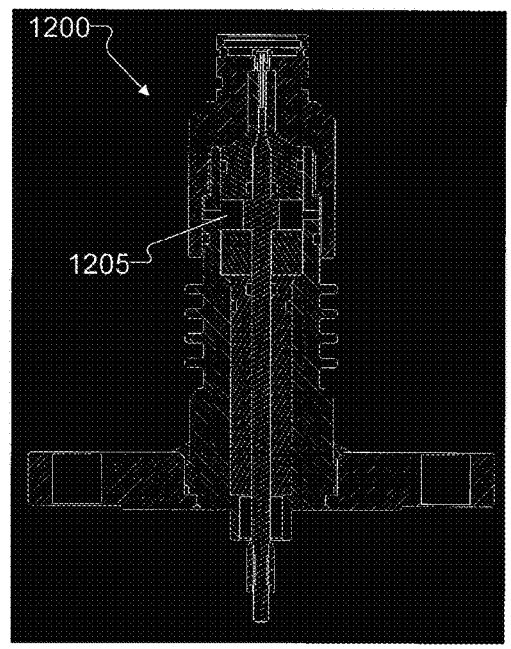

FIGS. 12A and 12B illustrate an example process connector 1200 according to this disclosure. In particular, FIG. 12A shows a solid view of the side of the process connector 1200, and FIG. 12B shows a longitudinal cross-section view of the center of the process connector 1200. The process connector 1200 could be the same as or similar to, and can operate in the same or similar manner as, the process connector 230 in FIG. 2.

When a primary seal (such as an O-ring) of the process connector 1200 fails, material (such as from within the tank) can migrate toward an atmospheric vent of the process connector 1200 or migrate into an annular cavity or void 1205 below a secondary seal (such as a glass-to-metal seal) of the process connector 1200. Material in the void 1205 can change the characteristic impedance of that section of the process connector 1200 and reflect a signal that the GWR receiver detects. The analyzer 310 can use the signal reflected from the void section of the process connector 1200 as a diagnostic indicator that the primary seal has failed. The analyzer 310 can cause the MCU 130 to generate an alarm indicating to a user that the primary seal has failed and to schedule replacement or repair of the process connector 1200.

Figure 13:
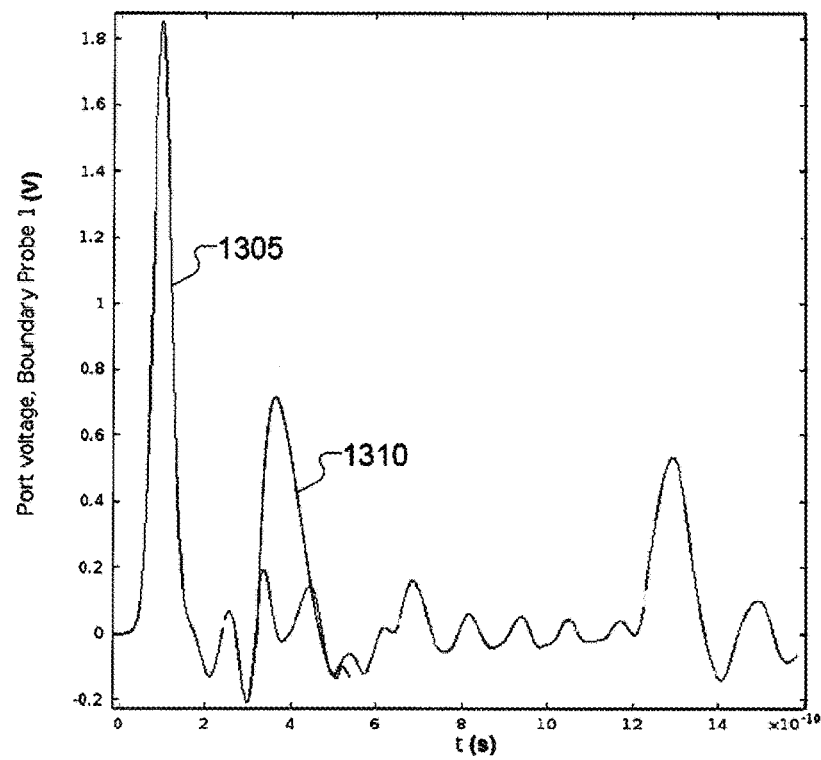
FIG. 13 illustrates example waveforms of reflected energy from inside a process connector according to this disclosure.

An example of this is shown in FIG. 13, which illustrates example waveforms 1305-1310 of reflected energy from inside a process connector according to this disclosure. The waveform 1305 represents reflected energy from inside the process connector 1200 when the void 1205 is empty. The waveform 1310 represents reflected energy from inside the process connector 1200 when process fluid is present in the void 1205. An increase in amplitude in an area of the waveform 1310 is indicative of the process fluid's presence within the void 1205. The increase in amplitude in an area of the waveform 1310 is caused by a change of characteristic impedance of the section of the process connector 1200 the containing the void 1205. The presence of process fluid in the void 1205 changes the impedance in that section of the process connector 1200 from the baseline impedance when the void 1205 is empty. As noted above, an alarm or other suitable indicator could be generated when a fault, such as the leak in the process connector 1200 is detected.

In certain embodiments, the GWR 200 is configured to periodically test to determine whether process fluid is present in the void 1205. The duration of the test is temporary, and the GWR 200 resumes obtaining measurements in the material in the tank after the test. For example, twice per day the GWR 200 periodically conducts the test to detect the presence of process fluid in the void 1205 by temporarily altering or reducing the length of the pulse width to map the multiple reflections caused by the process connector 1200. During the test, the pulse width can be reduced to a minimum. The GWR 200 uses the waveforms mapped of the empty void 1205 to compare with the waveforms received during the test to detect whether the process connector 1200 has filled with fluid or has degraded due to interaction with the process. For example, the ripples in the negative distance area, which is to the left of the Dead Zone line 1120 in FIG. 11 represent multiple signal reflections within the process connector 1200 before the GWR flange at the top end 122 at a short pulse width, yet the ripples disappear from the negative distance area of FIG. 10, which is the left of the dead zone line 1020, due to the longer pulse width.

Although FIGS. 12A and 12B illustrate one example of a process connector 1200, various changes may be made to FIGS. 12A and 12B. For example, any other suitable process connector 1200 having any suitable design could be used with a GWR 200. Although FIG. 13 illustrates examples of waveforms of reflected energy from inside a process connector, various changes may be made to FIG. 13. For instance, the waveforms shown here are examples only, and other waveforms could exist depending on (among other things) the design of the process connector 1200 and the material leaking into the process connector 1200.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A non-transitory computer readable medium embodying a computer program, the computer program comprising computer readable program code that when executed causes at least one processing device to:
   determine an optimal pulse width for obtaining level measurements associated with material in a tank;
   generate a control signal that causes a transmitter of a guided wave radar (GWR) to transmit a signal having the optimal pulse width; and
   send the control signal to the transmitter;
   wherein the optimal pulse width is based on a relative dielectric constant of the material between inner and outer conductor of the probe and at least one parameter, the at least one parameter including at least one of:
   a diameter of a nozzle to which the GWR is mounted;
   a diameter of a probe of the GWR.

2. The non-transitory computer readable medium of claim 1, wherein the computer program further comprises computer readable program code that when executed causes the at least one processing device to:
   alter a length of the optimal pulse width in order to reduce false echoes detected by the GWR.

3. The non-transitory computer readable medium of claim 1, wherein the computer program further comprises computer readable program code that when executed causes the at least one processing device to:
   alter a length of the optimal pulse width in order to reduce a size of an upper dead zone of the GWR.

4. The non-transitory computer readable medium of claim 1, wherein the computer program further comprises computer readable program code that when executed causes the at least one processing device to:
   temporarily alter a length of the optimal pulse width in order to detect a presence of material in a process connector of the GWR;
   receive reflected signals associated with the altered pulse width; and
   in response to detecting a change of impedance from a baseline impedance, generate an indicator identifying a fault of the process connector.

5. The non-transitory computer readable medium of claim 1, wherein the computer program further comprises computer readable program code that when executed causes the at least one processing device to:
   receive a temperature measurement associated with the GWR;

determine a control voltage of the control signal that causes the transmitter of the GWR to transmit the signal having the optimal pulse width;

adjust the control voltage of the control signal based on the measured temperature; and generate the control signal having the adjusted control voltage.

6. The non-transitory computer readable medium of claim 1, wherein the computer program further comprises computer readable program code that when executed causes the at least one processing device to:

receive user input of the at least one parameter; and determine the optimal pulse width based on the at least one parameter.

7. The non-transitory computer readable medium of claim 1, wherein the optimal pulse width is inversely proportional to a cutoff frequency that has a maximum value based on:

the diameter of the nozzle, the diameter of the probe, and the relative dielectric constant of the material between inner and outer conductor of the probe.

8. An apparatus comprising:

at least one processing device configured to:

determine an optimal pulse width for obtaining level measurements associated with material in a tank;

generate a control signal that causes a transmitter of a guided wave radar (GWR) to transmit a signal having the optimal pulse width; and send the control signal to the transmitter;

wherein the optimal pulse width is based on a relative dielectric constant of the material between inner and outer conductor of the probe and at least one parameter, the at least one parameter including at least one of:

a diameter of a nozzle to which the GWR is mounted;

a diameter of a probe of the GWR.

9. The apparatus of claim 8, wherein the at least one processing device is further configured to alter a length of the optimal pulse width in order to reduce false echoes detected by the GWR.

10. The apparatus of claim 8, wherein the at least one processing device is further configured to alter a length of the optimal pulse width in order to reduce a size of an upper dead zone of the GWR.

11. The apparatus of claim 8, wherein the at least one processing device is further configured to:

temporarily alter a length of the optimal pulse width in order to detect a presence of material in a process connector of the GWR;

receive reflected signals associated with the altered pulse width; and in response to detecting a change of impedance from a baseline impedance, generate an indicator identifying a fault of the process connector.

12. The apparatus of claim 8, wherein the at least one processing device is further configured to:

receive a temperature measurement associated with the GWR;

determine a control voltage of the control signal that causes the transmitter of the GWR to transmit the signal having the optimal pulse width;

adjust the control voltage of the control signal based on the measured temperature; and generate the control signal having the adjusted control voltage.

13. The apparatus of claim 8, wherein the optimal pulse width is inversely proportional to a cutoff frequency that has a maximum value based on:

the diameter of the nozzle, the diameter of the probe, and the relative dielectric constant of the material between inner and outer conductor of the probe.

14. A method comprising:

determining an optimal pulse width for obtaining level measurements associated with material in a tank;

generating a control signal that causes a transmitter of a guided wave radar (GWR) to transmit a signal having the optimal pulse width; and sending the control signal to the transmitter;

wherein the optimal pulse width is based on a relative dielectric constant of the material between inner and outer conductor of the probe and at least one parameter, the at least one parameter including at least one of:

a diameter of a nozzle to which the GWR is mounted;

a diameter of a probe of the GWR.

15. The method of claim 14, further comprising:

altering a length of the optimal pulse width in order to reduce false echoes detected by the GWR.

16. The method of claim 14, further comprising:

altering a length of the optimal pulse width in order to reduce a size of an upper dead zone of the GWR.

17. The method of claim 14, further comprising:

temporarily altering a length of the optimal pulse width in order to detect a presence of material in a process connector of the GWR;

receiving reflected signals associated with the altered pulse width; and in response to detecting a change of impedance from a baseline impedance, generating an indicator identifying a fault of the process connector.

18. The method of claim 14, further comprising:

receiving a temperature measurement associated with the GWR; and determining a control voltage of the control signal that causes the transmitter of the GWR to transmit the signal having the optimal pulse width;

adjusting the control voltage of the control signal based on the measured temperature; and generating the control signal having the adjusted control voltage.

* * * * *